(12) United States Patent
Salter et al.

(10) Patent No.: US 12,459,465 B2
(45) Date of Patent: Nov. 4, 2025

(54) VEHICLE SENSOR CLEANING

(71) Applicant: Ford Global Technologies, LLC, Dearborn, MI (US)

(72) Inventors: Stuart C. Salter, White Lake, MI (US); Michael Kipley, Saline, MI (US); Kimberly Berry, Northville, MI (US); Brendan Francis Diamond, Grosse Pointe, MI (US); John Robert Van Wiemeersch, Novi, MI (US); Paul Kenneth Dellock, Northville, MI (US)

(73) Assignee: Ford Global Technologies, LLC

( * ) Notice: Subject to any disclaimer, the term of this patent is extended or adjusted under 35 U.S.C. 154(b) by 425 days.

(21) Appl. No.: 18/066,522

(22) Filed: Dec. 15, 2022

(65) Prior Publication Data

US 2024/0198970 A1 Jun. 20, 2024

(51) Int. Cl.
*B60S 1/48* (2006.01)
*B60S 1/56* (2006.01)

(52) U.S. Cl.
CPC .............. *B60S 1/481* (2013.01); *B60S 1/56* (2013.01); *B60S 1/485* (2013.01)

(58) Field of Classification Search
CPC ............ B60S 1/481; B60S 1/485; B60S 1/56
See application file for complete search history.

(56) References Cited

U.S. PATENT DOCUMENTS

| | | | |
|---|---|---|---|
| 10,706,293 B1 * | 7/2020 | Lei ........................ | G07C 5/008 |
| 10,829,091 B2 | 11/2020 | Herman et al. | |
| 11,059,458 B2 * | 7/2021 | Frederick ................. | B60S 1/56 |
| 11,180,119 B2 | 11/2021 | Dingli | |
| 11,241,721 B2 | 2/2022 | Violetta | |
| 2002/0005440 A1 * | 1/2002 | Holt ..................... | B05B 15/652 |
| | | | 239/284.2 |
| 2018/0354469 A1 | 12/2018 | Krishnan | |
| 2019/0323224 A1 | 10/2019 | Kline et al. | |
| 2020/0047719 A1 * | 2/2020 | Park ........................ | B08B 1/16 |
| 2020/0216034 A1 * | 7/2020 | Velasco ................... | B60S 1/528 |
| 2021/0394774 A1 * | 12/2021 | Zhang .............. | B60W 60/0025 |
| 2022/0327323 A1 * | 10/2022 | Deshmukh ............... | G06T 7/11 |

* cited by examiner

*Primary Examiner* — Benjamin L Osterhout
(74) *Attorney, Agent, or Firm* — Frank A. MacKenzie; Brooks Kushman P.C.

(57) ABSTRACT

A computer includes a processor and a memory, and the memory stores instructions executable to actuate a cleaning system to spray a sensor in accordance with a cleaning plan stored in the memory, actuate the cleaning system to spray the sensor in response to an input from an operator, and adjust the cleaning plan based on the input from the operator to actuate the cleaning system.

19 Claims, 6 Drawing Sheets

VEHICLE SENSOR CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
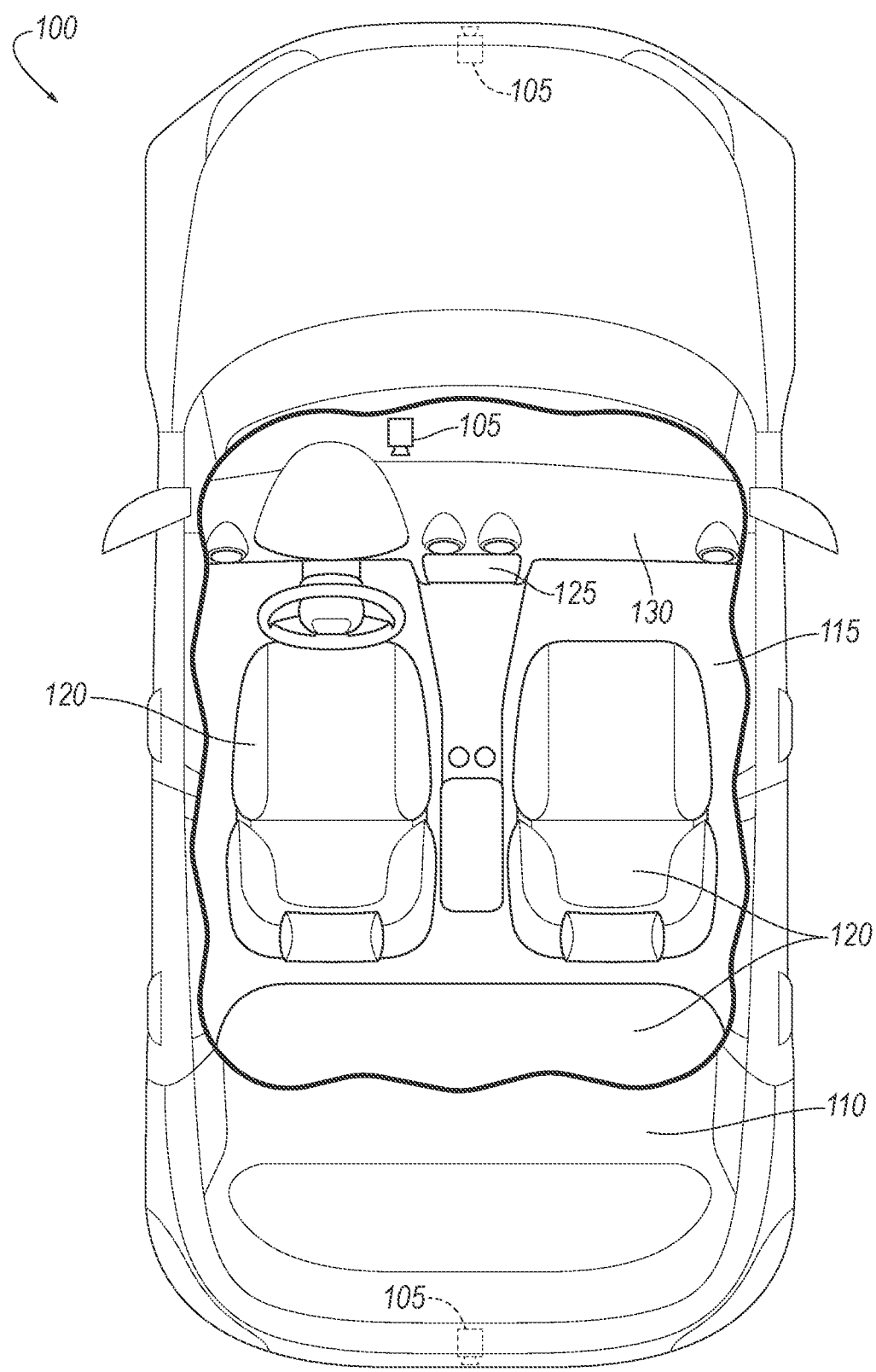
FIG. 1 is a top view of an example vehicle with a passenger cabin exposed for illustration.

This disclosure provides techniques for automatically actuating a cleaning system for sensors of a vehicle in a manner that is adjustable based on inputs by an operator of the vehicle to actuate the cleaning system, in other words, based on manual actuations of the cleaning system. A computer of the vehicle is programmed to actuate the cleaning system to spray one of the sensors in accordance with a cleaning plan stored in the memory of the computer, to actuate the cleaning system to spray the sensor in response to an input from the operator, and to adjust the cleaning plan based on that input. The cleaning plan is a set of instructions governing the actuation of the cleaning system. The cleaning plan may include instructions for determining a plurality of parameters defining the actuation of the cleaning system, including a dirtiness threshold for automatically actuating the cleaning system, a time interval at which the dirtiness is measured against the dirtiness threshold, a cleaning duration for which the cleaning system sprays when actuated, etc. More frequent manual inputs to actuate the cleaning system may cause a more sensitive dirtiness threshold, a shorter interval between dirtiness measurements, a longer cleaning duration, etc. The operating conditions when the inputs are provided by the operator may also change the parameters for automatic actuation, depending on the operating conditions during the potential automatic actuations. The cleaning system may use a minimal quantity of cleaning fluid while meeting operator expectations for cleanliness.

A computer includes a processor and a memory, and the memory stores instructions executable to actuate a cleaning system to spray a sensor in accordance with a cleaning plan stored in the memory, actuate the cleaning system to spray the sensor in response to an input from an operator, and adjust the cleaning plan based on the input from the operator to actuate the cleaning system.

In an example, the instructions may further include instructions to determine a dirtiness score based on data from the sensor and actuate the cleaning system to spray the sensor in response to the dirtiness score exceeding a dirtiness threshold, and the dirtiness threshold may be based on the cleaning plan. In a further example, the instructions may further include instructions to determine the dirtiness threshold based on the input from the operator to actuate the cleaning system to spray the sensor.

In an example, the instructions may further include instructions to, upon a threshold time elapsing since determining a dirtiness score, determine the dirtiness score based on data from the sensor, the threshold time based on the cleaning plan; and actuate the cleaning system to spray the sensor based on the dirtiness score. In a further example, the instructions may further include instructions to determine the threshold time based on the input from the operator to actuate the cleaning system to spray the sensor.

In an example, the instructions may further include instructions to actuate the cleaning system to spray the sensor for a cleaning duration, and the cleaning duration may be based on the cleaning plan. In a further example, the instructions may further include instructions to determine the cleaning duration based on the input from the operator to actuate the cleaning system to spray the sensor.

In an example, the instructions may further include instructions to, upon completing actuating the cleaning system to spray the sensor in accordance with the cleaning plan, determine a dirtiness score based on data from the sensor; and then, in response to the dirtiness score exceeding a dirtiness threshold, actuate the cleaning system to spray the sensor, the dirtiness threshold based on the cleaning plan. In a further example, the instructions may further include instructions to determine the dirtiness threshold based on the input from the operator to actuate the cleaning system to spray the sensor.

In another further example, the instructions may further include instructions to, upon actuating the cleaning system to spray the sensor in response to the dirtiness score exceeding the dirtiness threshold for a preset number of times, refrain from actuating the cleaning system to spray the sensor; and then output a message.

In an example, the instructions may further include instructions to determine a parameter of the cleaning plan based on the input from the operator to actuate the cleaning system to spray the sensor and actuate the cleaning system to spray the sensor in accordance with the parameter. In a further example, the instructions may further include instructions to determine the parameter based on the input and on an operating condition of a vehicle including the sensor and the cleaning system. In a yet further example, the operating condition may include a location of the vehicle.

In another yet further example, the operating condition may include a level of fluid supplying the cleaning system.

In an example, the instructions may further include instructions to, upon completing actuating the cleaning system to spray the sensor, instruct a user interface to display current image data from the sensor. In a further example, the instructions may further include instructions to, upon completing actuating the cleaning system to spray the sensor, instruct the user interface to display past image data from the sensor from before actuating the cleaning system to spray the sensor.

In another further example, the instructions may further include instructions to, upon completing actuating the cleaning system to spray the sensor, instruct the user interface to display the current image data with an overlay alongside the current image data with no overlay.

In an example, the sensor may be a first sensor, the instructions may further include instructions to instruct a user interface to output a message in accordance with the cleaning plan, and the message may indicate to clean a second sensor. In another example, the second sensor may be mounted in a passenger cabin of a vehicle, and the first sensor is mounted on an exterior of the vehicle.

A method includes actuating a cleaning system to spray a sensor in accordance with a cleaning plan stored in a memory, actuating the cleaning system to spray the sensor in response to an input from an operator, and adjusting the cleaning plan based on the input from the operator to actuate the cleaning system.

With reference to the Figures, wherein like numerals indicate like parts throughout the several views, a computer 305 of a vehicle 100 includes a processor 310 and a memory 315, and the memory 315 stores instructions executable to actuate a cleaning system 200 of the vehicle 100 to spray a sensor 105 in accordance with a cleaning plan 500 stored in the memory 315, actuate the cleaning system 200 to spray the sensor 105 in response to an input from an operator of the vehicle 100, and adjust the cleaning plan 500 based on the input from the operator to actuate the cleaning system 200.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 110. The vehicle 100 may be of a unibody construction, in which a frame and the body 110 of the vehicle 100 are a single component. The vehicle 100 may, alternatively, be of a body-on-frame construction, in which the frame supports the body 110 that is a separate component from the frame. The frame and the body 110 may be formed of any suitable material, for example, steel, aluminum, etc.

The vehicle 100 includes a passenger cabin 115 to house occupants, if any, of the vehicle 100. The passenger cabin 115 is partially or fully enclosed by the body 110. The passenger cabin 115 includes one or more seats 120 disposed in a front row at a front of the passenger cabin 115 and in a back row disposed behind the front row. The passenger cabin 115 may also include the seats 120 in a third row (not shown) at a rear of the passenger cabin 115. In FIG. 1, the seats 120 in the front row are bucket seats and in the back row are bench seats, but the seats 120 may be other types.

A user interface 125 presents information to and receives information from an operator of the vehicle 100. The user interface 125 may be located, e.g., on an instrument panel 130 in a passenger cabin 115 of the vehicle 100, or wherever may be readily seen by the operator. Components of the user interface 125 may be dispersed over multiple locations in the passenger cabin 115. The user interface 125 may include dials, digital readouts, screens, speakers, and so on for providing information to the operator, e.g., human-machine interface (HMI) elements such as are known. The user interface 125 may include buttons, knobs, keypads, microphone, and so on for receiving information from the operator.

The sensors 105 may detect the external world, e.g., objects and/or characteristics of surroundings of the vehicle 100, such as other vehicles, road lane markings, traffic lights and/or signs, pedestrians, etc. For example, the sensors 105 may include radar sensors, ultrasonic sensors, scanning laser range finders, light detection and ranging (lidar) devices, and image processing sensors such as cameras. As cameras, the sensor 105 can detect electromagnetic radiation in some range of wavelengths. For example, the sensors 105 may detect visible light, infrared radiation, ultraviolet light, or some range of wavelengths including visible, infrared, and/or ultraviolet light. For example, the sensors 105 can be charge-coupled devices (CCD), complementary metal oxide semiconductors (CMOS), or any other suitable type. For another example, the sensors 105 may be time-of-flight (TOF) cameras, which include a modulated light source for illuminating the environment and detect both reflected light from the modulated light source and ambient light to sense reflectivity amplitudes and distances to the scene.

The sensors 105 may be mounted on an exterior of the vehicle 100, e.g., on the body 110 of the vehicle 100, and/or in the passenger cabin 115. On the exterior of the vehicle 100, the sensors 105 may provide views of the external environment; e.g., the sensors 105 may include a backup camera mounted on a rear of the vehicle 100, a forward-facing camera on a front end of the vehicle 100, etc. In the passenger cabin 115, the sensors 105 provide data about the occupants of the vehicle 100; e.g., one of the sensors 105 may have a field of view encompassing a typical location of a face of the operator in order to monitor a state of the operator.

Figure 2:
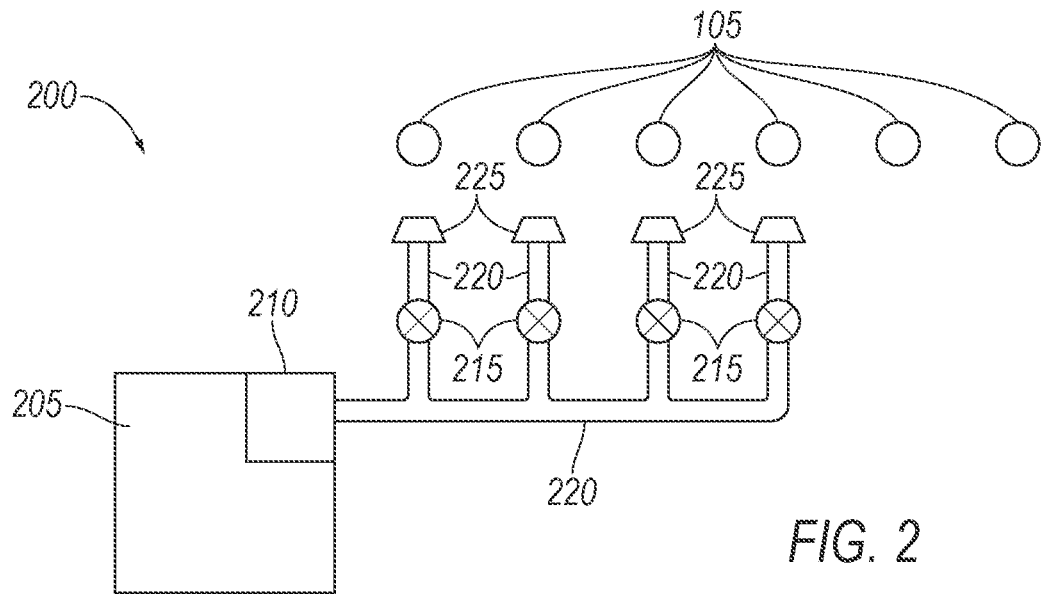
FIG. 2 is a diagram of an example cleaning system of the vehicle.

With reference to FIG. 2, the cleaning system 200 of the vehicle 100 may include a reservoir 205, a pump 210, valves 215, supply lines 220, and nozzles 225. The reservoir 205, the pump 210, and the nozzles 225 are fluidly connected to each other (i.e., fluid can flow from one to the other). The cleaning system 200 distributes washer fluid stored in the reservoir 205 to the nozzles 225. "Washer fluid" is any liquid stored in the reservoir 205 for cleaning. The washer fluid may include solvents, detergents, diluents such as water, etc.

The reservoir 205 may be a tank fillable with liquid, e.g., washer fluid for window cleaning. The reservoir 205 may be disposed in a front of the vehicle 100, specifically, in an engine compartment forward of a passenger cabin 115. The reservoir 205 may store the washer fluid only for supplying the sensors 105 or also for other purposes, such as supply to the windshield.

The pump 210 may force the washer fluid through the supply lines 220 to the nozzles 225 with sufficient pressure that the washer fluid sprays from the nozzles 225. The pump 210 is fluidly connected to the reservoir 205. The pump 210 may be attached to or disposed in the reservoir 205.

Each valve 215 is positioned and operable to control fluid flow from the pump 210 to one (or more) of the nozzles 225. Specifically, fluid from the supply line 220 from the pump 210 must flow through (at least) one of the valves 215 to reach the respective supply line 220 providing fluid to the respective nozzle 225. The valves 215 control flow by being actuatable between an open position permitting flow and a closed position blocking flow from the incoming to the outgoing of the supply lines 220. The valves 215 can be solenoid valves. As a solenoid valve, each valve 215 includes a solenoid and a plunger. Electrical current through the solenoid generates a magnetic field, and the plunger moves in response to changes in the magnetic field. The solenoid moves the plunger between a position in which the valve 215 is open and a position in which the valve 215 is closed.

The supply lines 220 extend from the pump 210 to the nozzles 225. The supply lines 220 may be, e.g., flexible tubes.

Each nozzle 225 may be fixedly positioned to eject fluid onto one of the sensors 105, i.e., spray the sensor 105. For example, each nozzle 225 may be positioned adjacent to one of the sensors 105 and oriented to eject fluid onto a lens of that sensor 105. Some of the sensors 105 may have respective nozzles 225, and some of the sensors 105 may lack respective nozzles 225. For example, the sensors 105 positioned on the exterior of the vehicle 100 may have nozzles 225 aimed at the sensors 105, and the sensors 105 positioned in the passenger cabin 115 may lack nozzles 225 aimed at the sensors 105, e.g., so as to avoid getting fluid on the upholstery or the operator.

Figure 3:
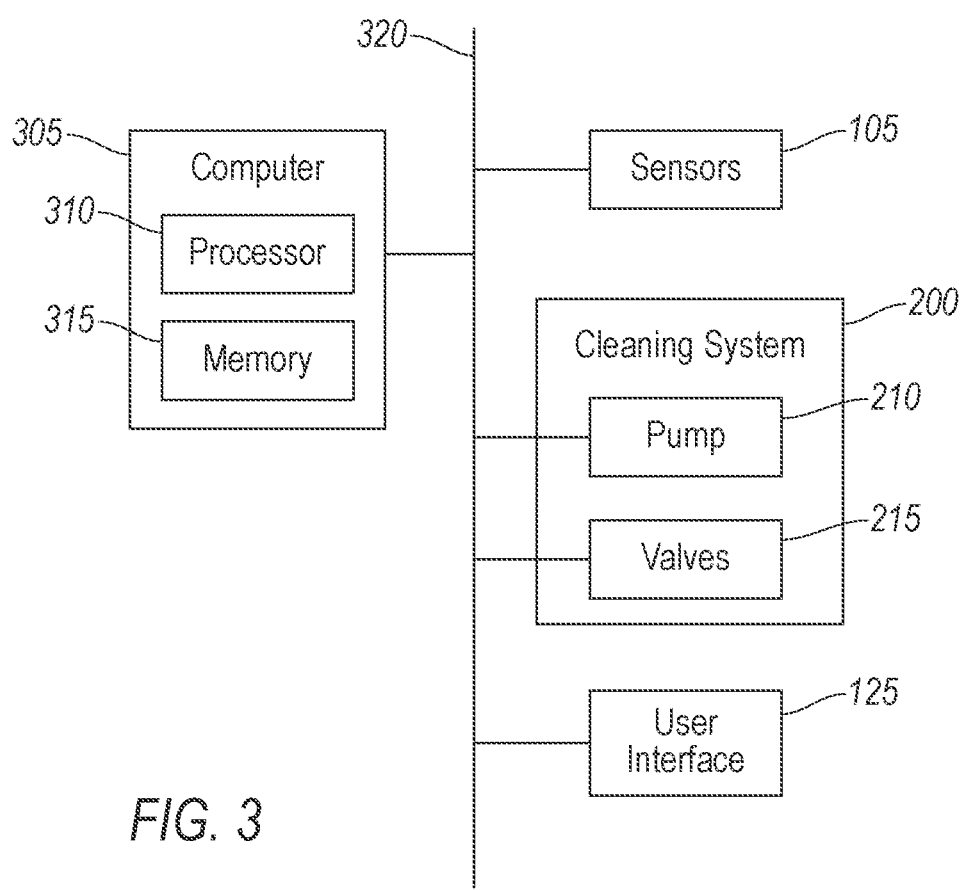
FIG. 3 is a block diagram of an example control system for the cleaning system.

With reference to FIG. 3, the computer 305 is a microprocessor-based computing device, e.g., a generic computing device including a processor 310 and a memory 315, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 305 can thus include a processor 310, a memory 315, etc. The memory 315 of the computer 305 can include media for storing instructions executable by the processor 310 as well as for electronically storing data and/or databases, and/or the computer 305 can include structures such as the foregoing by which programming is provided. The computer 305 can be multiple computers coupled together.

The computer 305 may transmit and receive data through a communications network 320 such as a controller area network (CAN) bus, Ethernet, WiFi, Local Interconnect Network (LIN), onboard diagnostics connector (OBD-II), and/or by any other wired or wireless communications network. The computer 305 may be communicatively coupled to the sensors 105; the cleaning system 200, e.g., the pump 210 and the valves 215; the user interface 125; and other components via the communications network 320.

The computer 305 is programmed to actuate the cleaning system 200 to spray a selected one of the sensors 105. For example, the computer 305 may actuate the pump 210 to supply washer fluid from the reservoir 205 and actuate a respective one of the valves 215 to open, thereby supplying washer fluid to the nozzle 225 that is aimed at the selected sensor 105. The washer fluid is ejected from the nozzle 225 onto the sensor 105, e.g., the lens, thereby washing dust or debris from the sensor 105.

The computer 305 is programmed to actuate the cleaning system 200 to spray a specific one of the sensors 105 in response to an input from an operator. The operator may provide the input via the user interface 125. The input may be a command to spray the specific sensor 105, to spray a subset of the sensors 105 including the specific sensor 105, or to spray another component and the specific sensor 105. For example, the user interface 125 may display options selectable by the operator to clean, e.g., the forward-facing sensors 105 or the rearward-facing sensors 105, or to clean a rear window and a backup camera of the sensors 105.

The computer 305 is programmed to actuate the cleaning system 200 to spray a sensor 105 in accordance with the cleaning plan 500. For the purposes of this disclosure, a "cleaning plan" is a set of instructions governing the actuation of a cleaning system. The cleaning plan 500 may govern the actuation of the cleaning system 200 in the absence of the input from the operator to spray one or more of the sensors 105. The cleaning plan 500 is stored in the memory 315 of the computer 305. The cleaning plan 500 may be a set of rules for actuating the cleaning system 200, or the cleaning plan 500 may be a machine-learning program, as described below with respect to FIG. 5.

The cleaning plan 500 may include instructions for determining a plurality of parameters. Determining the parameters will be described below with respect to FIG. 5. The parameters may define the actuation of the cleaning system 200. For example, the parameters may include a threshold time 505, a first dirtiness threshold 510, a cleaning duration 520, and a second dirtiness threshold 525. Here is a brief overview of these parameters, the use of which will be described in more detail below. The threshold time 505 is an interval between instances of determining a dirtiness score (described below). The first dirtiness threshold 510 is, when exceeded by the dirtiness score, a trigger for actuating the cleaning system 200 to spray the sensor 105. The cleaning duration 520 is a length of time that the cleaning system 200 is actuated to spray the sensor 105, i.e., the length of time that the sensor 105 is actively being sprayed. The second dirtiness threshold 525 is, when exceeded after the sensor 105 has just been sprayed, a trigger for actuating the cleaning system 200 again to spray the sensor 105.

The computer 305 may be programmed to wait for the threshold time 505 to elapse since determining a dirtiness score before again determining the dirtiness score. The cleaning system 200 may be idle during the wait, i.e., the computer 305 may refrain from actuating the cleaning system 200 during the wait unless an input from the operator is received. For example, the computer 305 may wait for the threshold time 505 since last determining the dirtiness score or last spraying the sensor 105, whichever occurred later.

The computer 305 may be programmed to determine the dirtiness score, e.g., upon the threshold time 505 elapsing since determining the dirtiness score. The dirtiness score may indicate a dirtiness of one of the sensors 105. The computer 305 may determine the dirtiness score based on data from that sensor 105. For example, the computer 305 may receive a sequence of image frames from the sensor 105 and determine a quantity of the image frame that is unchanging across the sequence of the image frames. The quantity of the image frame may be, e.g., a number of pixels or a proportion of the image frame. The sequence may be captured while the vehicle 100 is in motion. Portions of the image frame occupied by the vehicle 100 may be ignored, as those portions may not change even if the sensor 105 is clean. The portions of the image frame occupied by the vehicle 100 may be known in advance based on the fixed location of the sensor 105.

The computer 305 may be programmed to actuate the cleaning system 200 to spray the sensor 105 based on the dirtiness score, in accordance with the cleaning plan 500. For example, the computer 305 may actuate the cleaning system 200 to spray the sensor 105 in response to the dirtiness score exceeding the first dirtiness threshold 510, i.e., the dirtiness score indicating that the sensor 105 is dirtier than a dirtiness represented by the first dirtiness threshold 510, i.e., the dirtiness score being greater than the first dirtiness threshold 510 if a higher dirtiness score indicates greater dirtiness, or the dirtiness score being less than the first dirtiness threshold 510 if a lower dirtiness score indicates greater dirtiness. (The cleaning plan 500 may determine the first dirtiness threshold 510, as described below.)

The computer 305 may be programmed to, when actuating the cleaning system 200 to spray the sensor 105 in accordance with the cleaning plan 500, actuate the cleaning system 200 to spray the sensor 105 for the cleaning duration 520, i.e., in accordance with the cleaning plan 500 that defines the cleaning duration 520. The computer 305 may cease the cleaning system 200 spraying the sensor 105 upon the cleaning duration 520 elapsing since beginning to spray the sensor 105. For example, when the computer 305 actuates the cleaning system 200 to spray the sensor 105 (e.g., in response to the input from the operator or in response to the dirtiness score exceeding the first dirtiness threshold 510), the computer 305 may actuate the pump 210 to supply washer fluid from the reservoir 205 and one of the valves 215 to open. Then, after the cleaning duration 520 has elapsed, the computer 305 may actuate the valve 215 that opened to close and/or actuate the pump 210 to cease supplying washer fluid.

The computer 305 may be programmed to instruct the user interface 125 to output a message in accordance with the cleaning plan 500. The message may indicate to clean one of the sensors 105, e.g., one of the sensors 105 in the passenger cabin 115 for which a nozzle 225 is not provided. For example, the message may state that cleaning is suggested and indicate a location of the sensor 105, e.g., with a graphic of the passenger cabin 115 having a location of the sensor 105 marked. The computer 305 may instruct the user interface 125 to output the message in response to the dirtiness score for that sensor 105 exceeding the first dirtiness threshold 510. In other words, for a sensor 105 lacking a respective nozzle 225, the computer 305 may instruct the user interface 125 to output the message in lieu of actuating the cleaning system 200 to spray the sensor 105.

The computer 305 may be programmed to, in response to the dirtiness score for a sensor 105 exceeding a third dirtiness threshold and not exceeding the first dirtiness threshold 510, sharpen image data returned by the sensor 105. The third dirtiness threshold may be a parameter defined by the cleaning plan 500 or may be a preset value stored in the memory 315. The third dirtiness threshold represents a less dirty sensor 105 than the first dirtiness threshold 510; i.e., the third dirtiness threshold is easier for the dirtiness score to exceed than the first dirtiness threshold 510. The third dirtiness threshold may be chosen based on the dirtiness score at which operators typically report that sharpening is beneficial or noticeable. Sharpening the image data may be limited to situations in which the image data is being displayed by the user interface 125, e.g., when the vehicle 100 is in reverse and a display 400 of the user interface 125 is displaying image data supplied by a backup camera. The computer 305 may use any suitable technique for sharpening the image data, e.g., unsharp masking.

The computer 305 may be programmed to, upon completing actuating the cleaning system 200 to spray the sensor 105 in accordance with the cleaning plan 500, determine the dirtiness score and, in response to the dirtiness score exceeding the second dirtiness threshold 525, actuate the cleaning system 200 to spray the sensor 105. For example, the computer 305 may determine the dirtiness score at a preset interval after the cleaning system 200 ceases spraying the sensor 105. The preset interval may be chosen based on a typical drying time for the sensor 105. The computer 305 may repeat the steps of determining the dirtiness score and actuating the cleaning system 200 to spray the sensor 105 multiple times until the dirtiness score no longer exceeds the second dirtiness threshold 525.

The computer 305 may be programmed to, upon actuating the cleaning system 200 to spray the sensor 105 in response to the dirtiness score exceeding the second dirtiness threshold 525 for a preset number of times, refrain from actuating the cleaning system 200 to spray the sensor 105 and then output a message. The preset number may be chosen based on a likelihood that the sensor 105 has an obstruction that the cleaning system 200 is incapable of removing. The computer 305 may output the message by, e.g., instructing the user interface 125 to display the message, e.g., on the display 400. The message may indicate that the cleaning system 200 was unsuccessful at cleaning the sensor 105 and indicate a location of the sensor 105, e.g., with a graphic of the vehicle 100 having a location of the sensor 105 marked.

Figure 4:
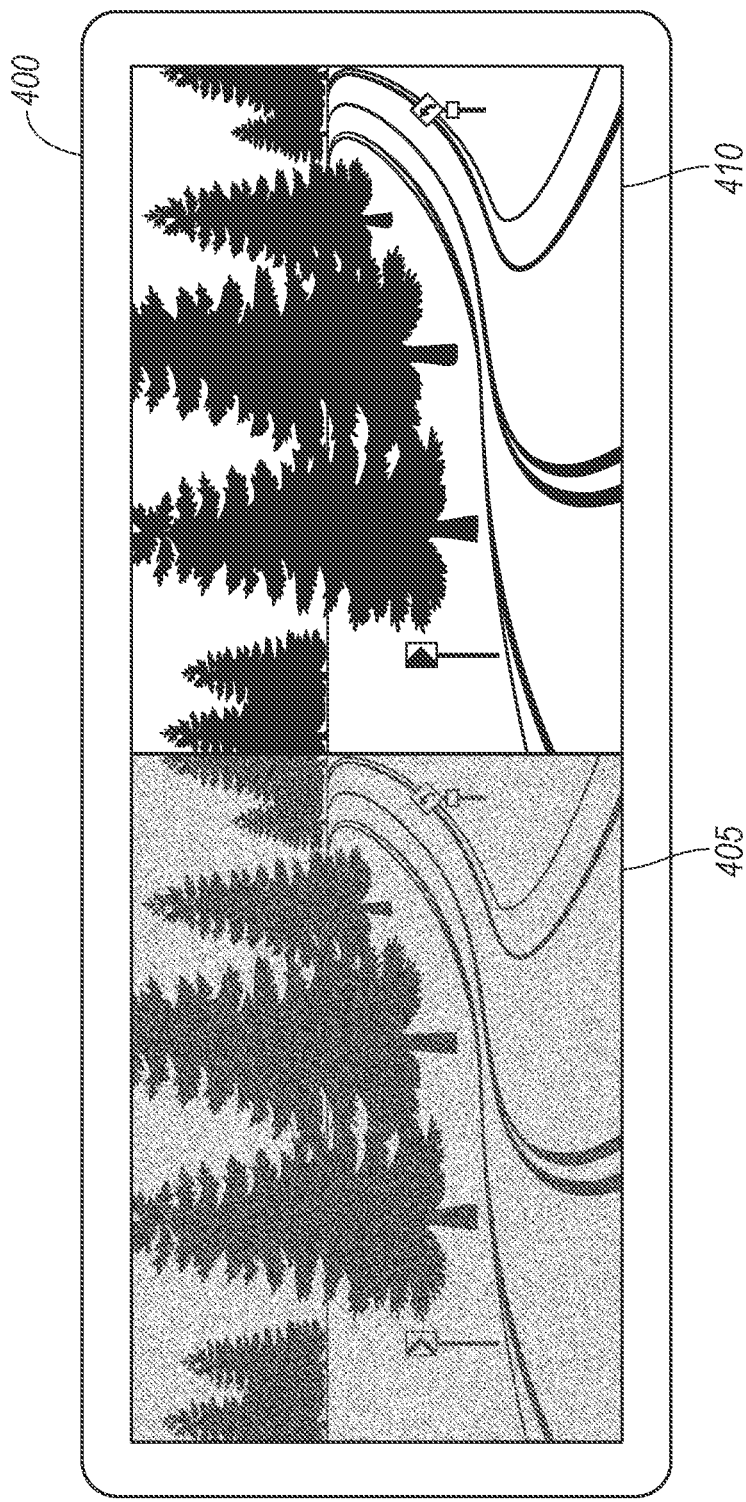
FIG. 4 is an example display of a user interface of the vehicle.

With reference to FIG. 4, the computer 305 may be programmed to, upon completing actuating the cleaning system 200 to spray the sensor 105, instruct the user interface 125 to display a first panel 405 and a second panel 410 alongside each other on the display 400. For example, the computer 305 may instruct the user interface 125 to display the first panel 405 and the second panel 410 upon completing actuating the cleaning system 200 to spray the sensor 105 and the dirtiness score not exceeding the second dirtiness threshold 525. The second panel 410 may include current image data from the sensor 105. The second panel 410 may display the current image data from the sensor 105 unchanged, e.g., with no overlay or other modifications. The first panel 405 may include past image data from the sensor 105 from before actuating the cleaning system 200 to spray the sensor 105, e.g., image data from after determining to actuate the cleaning system 200 and before actuating the cleaning system 200. Alternatively, the first panel 405 may include the current image data with an overlay. The overlay may partially obscure the image or blur the image.

Figure 5:
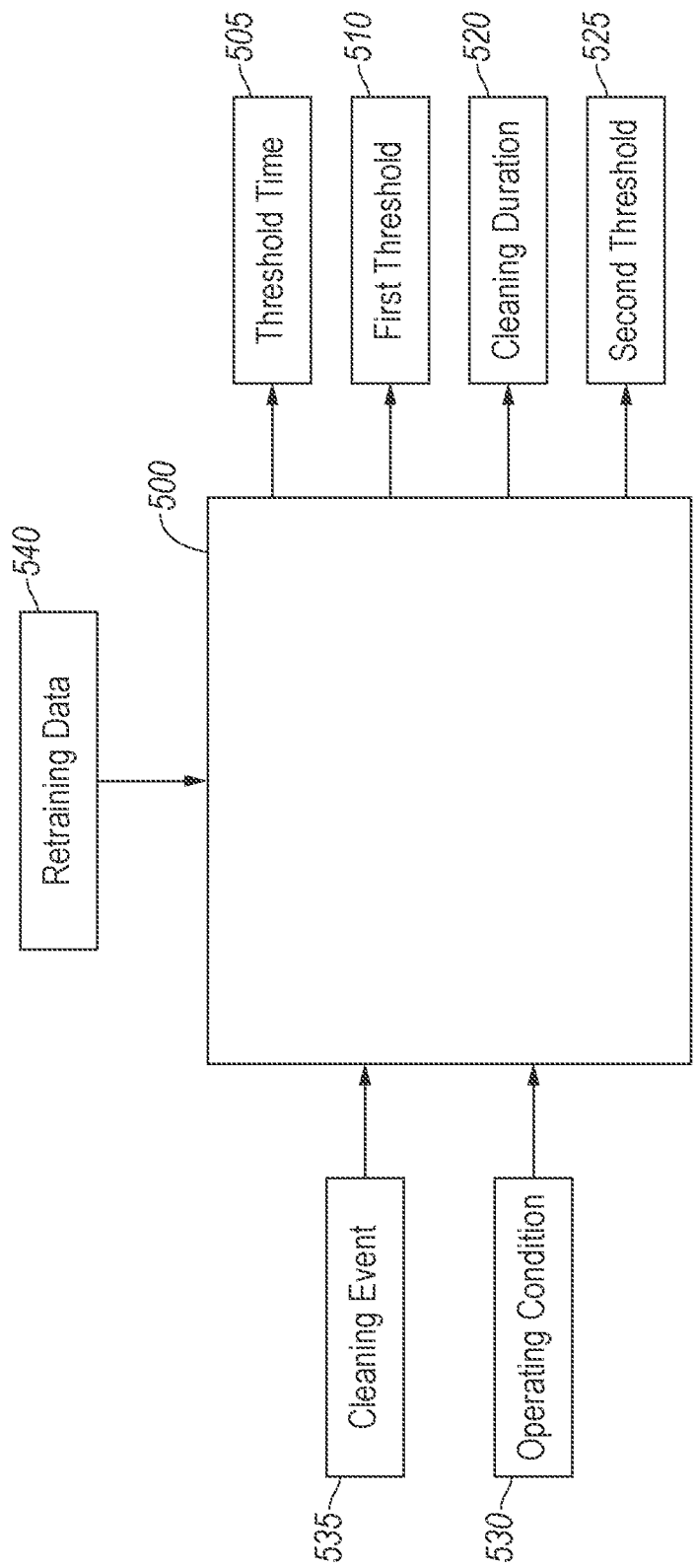
FIG. 5 is a diagram of an example machine-learning program for controlling the cleaning system.

With reference to FIG. 5, the computer 305 is programmed to adjust the cleaning plan 500 based on the input from the operator to actuate the cleaning system 200. For example, the cleaning plan 500 may be a machine-learning program or set of formulas for calculating the parameters, e.g., the threshold time 505, the first dirtiness threshold 510, the cleaning duration 520, and/or the second dirtiness threshold 525. The cleaning plan 500 may include weights in the machine-learning program or coefficients in the formulas. For example, the machine-learning program may be a neural network including a plurality of neurons and a plurality of connections between neurons weighted by the weights. The computer 305 may adjust the weights or coefficients based on the input. For example, the computer 305 may adjust the weights or coefficients in a direction tending to more frequent or longer actuation of the cleaning system 200, e.g., shorter threshold time 505, more sensitive first dirtiness threshold 510, longer cleaning duration 520, and/or more sensitive second dirtiness threshold 525, in response to the input being received before the threshold time 505 or the input being received when the dirtiness score does not exceed the first dirtiness threshold 510. For another example, the computer 305 may adjust the weights or coefficients in a direction tending to less frequent or shorter actuation of the cleaning system 200 in response to a prespecified time elapsing since last receiving the input from the operator. The prespecified time may be significantly longer than the threshold time 505, e.g., at least double. For another example, the computer 305 may adjust the weights or coefficients based on an operating condition 530 (described below) when receiving the input, e.g., more frequent or longer actuation of the cleaning system 200 when a current operating condition 530 matches the operating condition 530 during the input. The computer 305 may adjust the weights or coefficients by incrementing or decrementing the weights or coefficients by a preset quantity upon receiving the input, or the computer 305 may adjust the weights of the machine-learning program by retraining the machine-learning program, as described below, at prespecified intervals.

The computer 305 is programmed to determine the parameters for actuating the cleaning system 200, e.g., the threshold time 505, the first dirtiness threshold 510, the cleaning duration 520, and/or the second dirtiness threshold 525. The computer 305 may execute the cleaning plan 500, e.g., execute the machine-learning program or the formulas, to determine the parameters. The cleaning plan 500 may include instructions for determining the parameters defining the actuation of the cleaning system 200, e.g., the weights and respective connections in a neural network, or the formulas. Determining the parameters is thus based on the input.

The computer 305 determines the parameters based on a cleaning event 535 and on the operating condition 530. The cleaning event 535 is the input by the operator to actuate the cleaning system 200 or may be the determination to actuate the cleaning system 200 in response to the dirtiness score exceeding the first dirtiness threshold 510 or second dirtiness threshold 525.

The operating condition 530 may be received as an input to the cleaning plan 500 to execute the cleaning plan 500. For the purposes of this disclosure, an "operating condition" is defined as a current state of the vehicle 100 or surroundings of the vehicle 100. The operating condition 530 may include the motion state of the vehicle 100, type of road on which the vehicle 100 is traveling, current weather conditions the vehicle 100 is experiencing, values relating to engine components of the vehicle 100, etc. For example, the operating condition 530 may include a location of the vehicle 100. The computer 305 may, in response to receiving an input to actuate the cleaning system 200 at a particular location, adjust the cleaning plan 500 tending to more frequent or longer actuations of the cleaning system 200 within a preset distance from the location, in a same region as the location, on a same type of road as the location, etc. For another example, the operating condition 530 may include a level of fluid supplying the cleaning system 200, e.g., in the reservoir 205. The cleaning plan 500 may determine the parameters tending to less frequent or shorter actuations of the cleaning system 200 in response to the level of fluid being lower or being below a threshold.

The cleaning plan 500 may be a machine-learning program. For example, the cleaning plan 500 may be a convolutional neural network or any other suitable type of machine-learning program for outputting the parameters. The machine-learning program may be pretrained before installation on the computer 305. For example, the machine-learning program may be trained on training data that includes inputs to actuate the cleaning systems of vehicles by many different operators paired with the operating conditions of the vehicles when receiving the inputs. The training may use a loss function chosen to minimize consumption of washer fluid while maintaining a dirtiness score indicated by the training data.

The computer 305 may be programmed to retrain the machine-learning program, thereby adjusting the cleaning plan 500. Retraining may be performed in the same manner as training but using retraining data 540. The retraining data 540 may include the cleaning events 535 paired with the operating conditions 530 when receiving the cleaning events 535. The computer 305 may retrain the machine-learning program at prespecified intervals. Alternatively or additionally, the computer 305 may retrain the machine-learning program upon receiving a preset quantity of retraining data 540. The preset quantity may be chosen based on a typical quantity of data used for training that type of machine-learning program.

Figure 6:
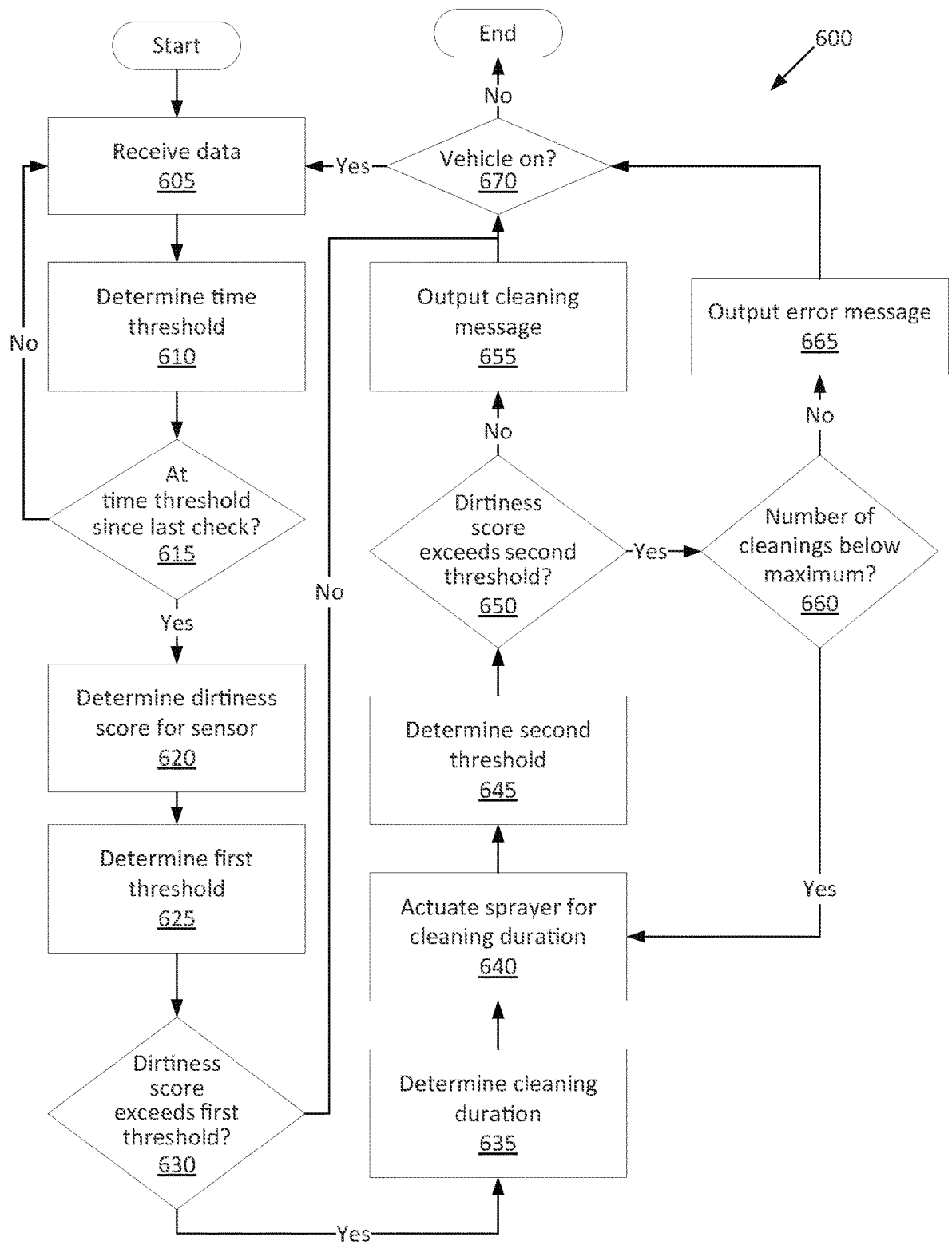
FIG. 6 is a process flow diagram of an example process for controlling the cleaning system.

FIG. 6 is a process flow diagram illustrating an example process 600 for controlling the cleaning system 200. The memory 315 of the computer 305 stores executable instructions for performing the steps of the process 600 and/or programming can be implemented in structures such as mentioned above. As a general overview of the process 600, the computer 305 receives data and determines the threshold time 505. Upon the threshold time 505 elapsing since determining the dirtiness score, the computer 305 determines the dirtiness score and the first dirtiness threshold 510. In response to the dirtiness score exceeding the first dirtiness threshold 510, the computer 305 determines the cleaning duration 520, actuates the cleaning system 200 for the cleaning duration 520, and determines the second dirtiness threshold 525. In response to the dirtiness score exceeding the second dirtiness threshold 525, the computer 305 re-actuates the cleaning system 200 for the cleaning duration 520, up to a preset number of times, then outputs a message indicating that the dirtiness score still exceeds the second dirtiness threshold 525. In response to the dirtiness score not exceeding the second dirtiness threshold 525, the computer 305 outputs a message with current image data from the sensor 105. The process 600 continues for as long as the vehicle 100 is on.

The process 600 begins in a block 605, in which the computer 305 receives data from the sensor 105, e.g., image data, as well as data indicating the operating condition 530, e.g., the level of washer fluid in the reservoir 205, a location of the vehicle 100 according to a GPS sensor. etc.

Next, in a block 610, the computer 305 determines the threshold time 505 according to the cleaning plan 500, as described above.

Next, in a decision block 615, the computer 305 determines whether the time elapsed since last determining the dirtiness score (or time since starting the vehicle 100) has reached the threshold time 505. If the time elapsed has not reached the threshold time 505, the process 600 returns to the block 605 to receive the most recent data. Upon the threshold time 505 elapsing since last determining the dirtiness score, the process 600 proceeds to a block 620.

In the block 620, the computer 305 determines the dirtiness score based on the data from the sensor 105 received in the block 605, as described above.

Next, in a block 625, the computer 305 determines the first dirtiness threshold 510 according to the cleaning plan 500, as described above.

Next, in a decision block 630, the computer 305 determines whether the dirtiness score from the block 620 exceeds the first dirtiness threshold 510 from the block 625, as described above. If the dirtiness score has not exceeded the first dirtiness threshold 510, the process 600 proceeds to a decision block 670. In response to the dirtiness score exceeding the first dirtiness threshold 510, the process 600 proceeds to a block 635.

In the block 635, the computer 305 determines the cleaning duration 520 according to the cleaning plan 500, as described above.

Next, in a block 640, the computer 305 actuates the cleaning system 200 to spray the sensor 105 for the cleaning duration 520 that was determined in the block 635, as described above.

Upon completing actuating the cleaning system 200 to spray the sensor 105, in a block 645, the computer 305 determines the second dirtiness threshold 525 according to the cleaning plan 500, as described above.

Next, in a decision block 650, the computer 305 re-determines the dirtiness score from new data from the sensor 105 and determines whether that dirtiness score exceeds the second dirtiness threshold 525 from the block 645, as described above. If the dirtiness score has not exceeded the second dirtiness threshold 525, the process 600 proceeds to a block 655. In response to the dirtiness score exceeding the second dirtiness threshold 525, the process 600 proceeds to a decision block 660.

In the block 655, the computer 305 instructs the user interface 125 to display the first panel 405 and the second panel 410, as described above with respect to FIG. 4. After the block 655, the process 600 proceeds to the decision block 670.

In the decision block 660, the computer 305 determines whether the cleaning system 200 has been consecutively actuated to spray the sensor 105 in the block 640 for at least a preset number of times. If not, the process 600 returns to the block 640 to again actuate the cleaning system 200 to spray the sensor 105. Upon reaching the preset number of times, the process 600 proceeds to a block 665.

In the block 665, the computer 305 refrains from actuating the cleaning system 200 to spray the sensor 105 and outputs a message, as described above. After the block 665, the process 600 proceeds to the decision block 670.

In the decision block 670, the computer 305 determines whether the vehicle 100 is still on. If so, the process 600 returns to the block 605 to receive the most recent data. If not, the process 600 ends.

Figure 7:
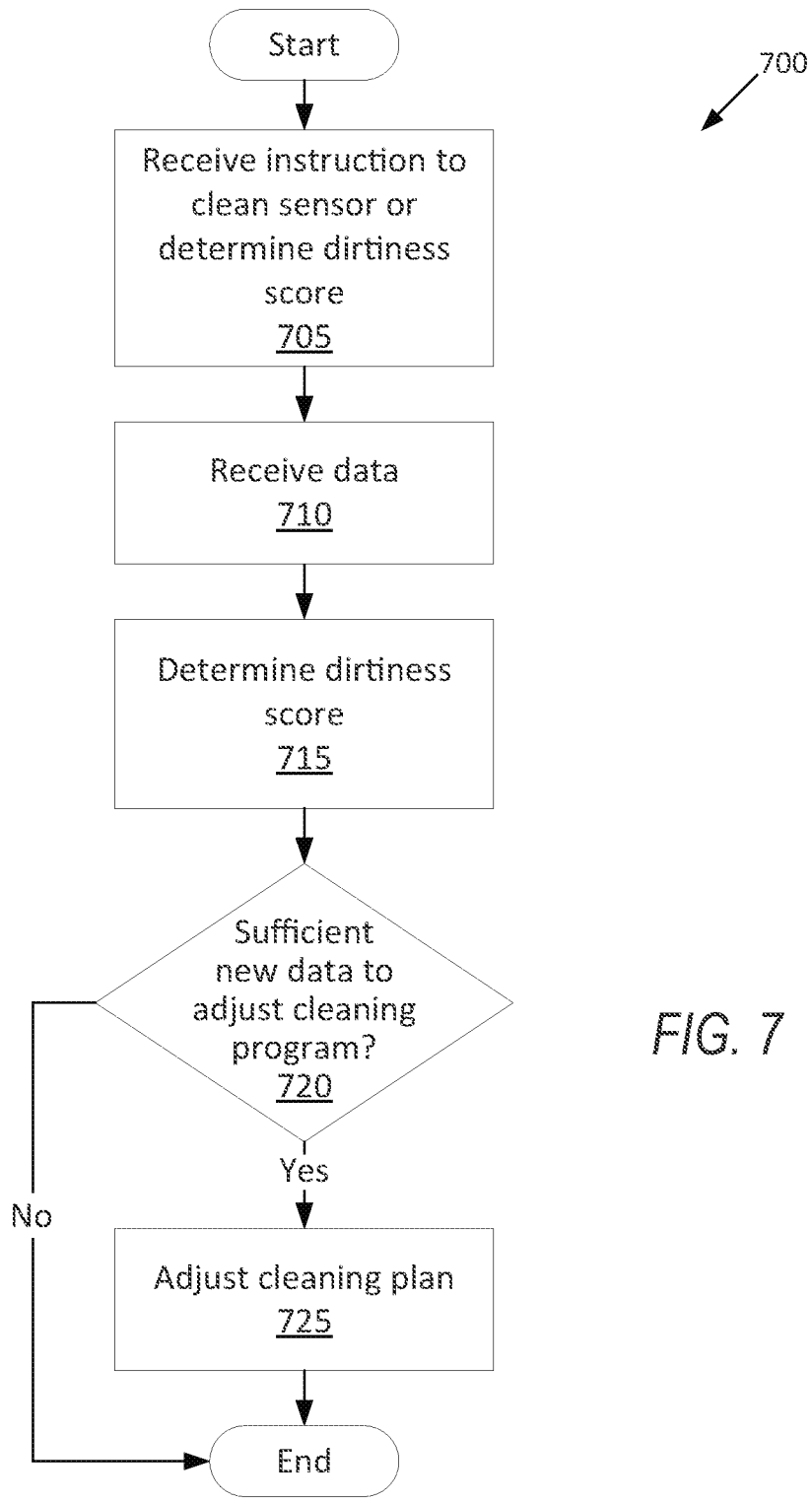
FIG. 7 is a process flow diagram of an example process for adjusting a cleaning plan for controlling the cleaning system.

FIG. 7 is a process flow diagram illustrating an example process 700 for adjusting the cleaning plan 500. The memory 315 of the computer 305 stores executable instructions for performing the steps of the process 700 and/or programming can be implemented in structures such as mentioned above. The computer 305 may execute the process 700 simultaneously with the process 600. The process 700 may be triggered to execute upon the occurrence of a cleaning event 535. As a general overview of the process 700, the computer 305 receives the cleaning event 535, receives data from the sensor 105, determines the dirtiness score, and determines whether to adjust the cleaning plan 500. If so, the computer 305 adjusts the cleaning plan 500.

The process 700 begins in a block 705, in which the computer 305 receives the cleaning event 535, i.e., the input from the operator to actuate the cleaning system 200 or the determination to actuate the cleaning system 200, as described above.

Next, in a block 710, the computer 305 receives data from the sensor 105, e.g., image data, as well as data indicating the operating condition 530, e.g., the level of washer fluid in the reservoir 205, a location of the vehicle 100 according to a GPS sensor, etc.

Next, in a block 715, the computer 305 determines the dirtiness score based on the data from the sensor 105 received in the block 710, as described above.

Next, in a block 720, the computer 305 determines whether to adjust the cleaning plan 500, e.g., whether to adjust the coefficients of the formulas or retrain the machine-learning program, as described above. If not, the process 700 ends. If so, the process 700 proceeds to a block 725.

In the block 725, the computer 305 adjusts the cleaning plan 500 based on the input from the operator to actuate the cleaning system 200, as described above. After the block 725, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable to:
   actuate a cleaning system to spray a sensor in response to an input from an operator, the input being a manual actuation commanding the cleaning system to spray the sensor;
   adjust a cleaning plan stored in the memory by determining a parameter based on the input from the operator to actuate the cleaning system; and
   after adjusting the cleaning plan, automatically actuate the cleaning system to spray the sensor in accordance with the parameter of the cleaning plan, without receiving the input.

2. The computer of claim 1, wherein the instructions further include instructions to:
   determine a dirtiness score based on data from the sensor; and
   actuate the cleaning system to spray the sensor in response to the dirtiness score exceeding a dirtiness threshold, the dirtiness threshold based on the cleaning plan.

3. The computer of claim 2, wherein the instructions further include instructions to determine the dirtiness threshold based on the input from the operator to actuate the cleaning system to spray the sensor.

4. The computer of claim 1, wherein the instructions further include instructions to:
   upon a threshold time elapsing since determining a dirtiness score, determine the dirtiness score based on data from the sensor, the threshold time based on the cleaning plan; and
   actuate the cleaning system to spray the sensor based on the dirtiness score.

5. The computer of claim 4, wherein the instructions further include instructions to determine the threshold time based on the input from the operator to actuate the cleaning system to spray the sensor.

6. The computer of claim 1, wherein the instructions further include instructions to actuate the cleaning system to spray the sensor for a cleaning duration, the cleaning duration based on the cleaning plan.

7. The computer of claim 6, wherein the instructions further include instructions to determine the cleaning duration based on the input from the operator to actuate the cleaning system to spray the sensor.

8. The computer of claim 1, wherein the instructions further include instructions to:
   upon completing actuating the cleaning system to spray the sensor in accordance with the cleaning plan, determine a dirtiness score based on data from the sensor; and
   then, in response to the dirtiness score exceeding a dirtiness threshold, actuate the cleaning system to spray the sensor, the dirtiness threshold based on the cleaning plan.

9. The computer of claim 8, wherein the instructions further include instructions to determine the dirtiness threshold based on the input from the operator to actuate the cleaning system to spray the sensor.

10. The computer of claim 8, wherein the instructions further include instructions to:
    upon actuating the cleaning system to spray the sensor in response to the dirtiness score exceeding the dirtiness threshold for a preset number of times, refrain from actuating the cleaning system to spray the sensor; and then output a message.

11. The computer of claim 1, wherein the instructions further include instructions to determine the parameter based on the input and on an operating condition of a vehicle including the sensor and the cleaning system.

12. The computer of claim 11, wherein the operating condition includes a location of the vehicle.

13. The computer of claim 11, wherein the operating condition includes a level of fluid supplying the cleaning system.

14. The computer of claim 1, wherein the instructions further include instructions to, upon completing actuating the cleaning system to spray the sensor, instruct a user interface to display current image data from the sensor.

15. The computer of claim 14, wherein the instructions further include instructions to, upon completing actuating the cleaning system to spray the sensor, instruct the user interface to display past image data from the sensor from before actuating the cleaning system to spray the sensor.

16. The computer of claim 14, wherein the instructions further include instructions to, upon completing actuating the cleaning system to spray the sensor, instruct the user interface to display the current image data with an overlay alongside the current image data with no overlay.

17. The computer of claim 1, wherein the sensor is a first sensor, wherein the instructions further include instructions to instruct a user interface to output a message in accordance with the cleaning plan, the message indicating to clean a second sensor.

18. The computer of claim 17, wherein the second sensor is mounted in a passenger cabin of a vehicle, and the first sensor is mounted on an exterior of the vehicle.

19. A method comprising:
actuating a cleaning system to spray a sensor in response to an input from an operator, the input being a manual actuation commanding the cleaning system to spray the sensor; adjusting a cleaning plan stored in a memory by determining a parameter based on the input from the operator to actuate the cleaning system; and
after adjusting the cleaning plan, automatically actuating the cleaning system to spray the sensor in accordance with the parameter of the cleaning plan, without receiving the input.

* * * * *